United States Patent
Phaff et al.

(10) Patent No.: US 9,482,858 B2
(45) Date of Patent: Nov. 1, 2016

(54) PIXEL WALL CONFIGURATION FOR DIRECTING FLUID FLOW FOR FABRICATING ELECTROWETTING DISPLAYS

(71) Applicant: Amazon Technologies, Inc., Reno, NV (US)

(72) Inventors: Ernest Jannis Phaff, Nuenen (NL); Hermanus Johannes Jansen, Veldhoven (NL); Henricus Matheus Josephus Leenen, Limburg (NL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/316,475

(22) Filed: Jun. 26, 2014

(65) Prior Publication Data

US 2015/0378146 A1  Dec. 31, 2015

(51) Int. Cl.
*G02B 26/00* (2006.01)

(52) U.S. Cl.
CPC .................. *G02B 26/005* (2013.01)

(58) Field of Classification Search
CPC ..................................... G02B 26/005
USPC ........................................... 359/290
See application file for complete search history.

(56) References Cited

U.S. PATENT DOCUMENTS

| 9,182,589 B2 * | 11/2015 | Sakai ................. G02B 26/005 |
| 2011/0157677 A1 | 6/2011 | Chen et al. |
| 2015/0378145 A1 | 12/2015 | Phaff et al. |

FOREIGN PATENT DOCUMENTS

| EP | 1076257 | 2/2001 |
| WO | WO2009106546 | 9/2009 |
| WO | WO2010133690 | 11/2010 |
| WO | WO2013087858 | 6/2013 |
| WO | WO2013087859 | 6/2013 |
| WO | WO2014072425 | 5/2014 |

OTHER PUBLICATIONS

PCT Search Report and Written Opinion mailed Sep. 16, 2015 for PCT/US15/35416, 11 pages.
PCT Search Report and Written Opinion mailed Dec. 17, 2015 for PCT application No. PCT/US2015/035395, 14 page.
Sun, et al., "Scalable Fabrication of Electrowetting Displays with Self-Assembled Oil Dosing", Applied Physics Letters, American Institute of Physics, vol. 91, No. 1, Jul. 2, 2007.

* cited by examiner

*Primary Examiner* — James Jones
(74) *Attorney, Agent, or Firm* — Lee & Hayes, PLLC (57) ABSTRACT

An apparatus for fabricating electronic displays comprises a glass substrate that includes pixel arrays formed on the glass substrate. Individual pixels of the pixel arrays include pixel walls to retain a first fluid, such as oil. The pixel arrays may include an edge seal to retain a second fluid, such as an electrolyte solution, that overlays the pixel walls and the first fluid. A fluid dispenser includes slits that are configured to dispense the first fluid and the second fluid onto the glass substrate at a non-orthogonal angle with respect to the pixel arrays. First portions of the pixel walls extend above second portions of the pixel walls to impart a flow of the first fluid and the second fluid in a direction that the first fluid and the second fluid are dispensed by the fluid dispenser.

19 Claims, 7 Drawing Sheets

┌─────────────────────────────────────────────────────────────┐
│   USE A FLUID DISPENSER TO DISPENSE A FIRST FLUID AND A     │
│   SECOND FLUID ONTO A TRANSPARENT SUBSTRATE THAT INCLUDES   │
│   ONE OR MORE ARRAYS OF DISPLAY ELEMENTS, WHEREIN THE       │
│   FIRST FLUID AND THE SECOND FLUID ARE DISPENSED AT A       │
│   SKEWED ANGLE RELATIVE TO ROWS AND COLUMNS OF THE          │
│   ARRAYS OF THE DISPLAY ELEMENTS                            │
│                          1102                               │
└─────────────────────────────────────────────────────────────┘
                              │
                              ▼
┌─────────────────────────────────────────────────────────────┐
│   USE FIRST PORTIONS OF PIXEL WALLS OF THE ARRAYS OF        │
│   DISPLAY ELEMENTS THAT EXTEND SUBSTANTIALLY FURTHER        │
│   FROM THE TRANSPARENT SUBSTRATE THAN SECOND PORTIONS OF    │
│   THE PIXEL WALLS TO DIRECT A FLOW OF THE FIRST FLUID AND   │
│   THE SECOND FLUID TOWARD A DIRECTION OF MOTION OF THE      │
│   FLUID DISPENSER                                           │
│                          1104                               │
└─────────────────────────────────────────────────────────────┘
                              │
                              ▼
         ┌───────────────────────────────────────┐
         │   AT LEAST PARTIALLY FILLING DISPLAY  │
         │    ELEMENTS WITH THE FIRST FLUID      │
         │                 1106                  │
         └───────────────────────────────────────┘
                              │
                              ▼
         ┌───────────────────────────────────────┐
         │    AT LEAST PARTIALLY COVERING THE    │
         │  DISPLAY ELEMENTS AND THE FIRST FLUID │
         │         WITH THE SECOND FLUID         │
         │                 1108                  │
         └───────────────────────────────────────┘
```

… # PIXEL WALL CONFIGURATION FOR DIRECTING FLUID FLOW FOR FABRICATING ELECTROWETTING DISPLAYS

BACKGROUND

Electronic displays are found in numerous types of electronic devices such as electronic book ("eBook") readers, cellular telephones, smart phones, portable media players, tablet computers, wearable computers, laptop computers, netbooks, desktop computers, televisions, appliances, home electronics, automotive electronics, augmented reality devices, and so forth. Electronic displays may present various types of information, such as user interfaces, device operational status, digital content items, and the like, depending on the kind and purpose of the associated device. The appearance and quality of a display can affect a user's experience with the electronic device and the content presented thereon. Accordingly, finding ways to enhance user experience and satisfaction continues to be a priority. Moreover, increased multimedia use imposes high demands on designs, packaging, and fabricating display devices, as content available for mobile use becomes more extensive and device portability continues to be a high priority.

Electronic displays, such as electrowetting displays, include an array of pixels individually bordered by pixel walls that retain a fluid such as opaque oil, for example. Light transmission through each pixel is adjustable by electronically controlling a position of the fluid in the pixel. A process of fabricating an electrowetting display includes a number of steps, a number of which can involve improvements that lead to lower fabricating costs and higher yields.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

In various embodiments described herein, electronic devices include displays for presenting content and other information. In some examples, the electronic devices may include one or more components associated with the display, such as a touch sensor component layered atop the display for detecting touch inputs, a front light or back light component for lighting the display, and/or a cover layer component, which may include antiglare properties, antireflective properties, anti-fingerprint properties, anti-cracking properties, and the like. Various embodiments described herein also include techniques for assembling electronic devices including these components for the displays and other features described herein.

Embodiments describe apparatuses and techniques for fabricating electrowetting displays. For example, in a batch fabrication environment, a number of display devices comprising arrays of display elements (e.g., pixels or subpixels) may be formed on a single substrate, which may be transparent. A fluid dispenser dispenses a first fluid (e.g., an opaque or colored liquid, such as oil) and a second fluid (e.g., that may be considered to be an electrolyte solution or other conductive liquid) onto the substrate that includes the display devices. The first fluid and the second fluid may be immiscible with one another. The fluid dispenser dispenses the first fluid into individual display elements. The fluid dispenser dispenses the second fluid so as to cover the dispensed first fluid and the individual display elements. Uniformity of thickness and volume of dispensed first and second fluids across the substrate is desired. When filling square or rectangular pixels arrays of display elements, the fluid dispenser may be at a skewed (e.g., a non-orthogonal) angle in reference to the array. While overall this angle may improve uniformity of the first fluid in the display elements of the arrays, an undesirable secondary effect resulting from the angled orientation of the fluid dispenser may tend to decrease the uniformity. During fluid dispensing, the angled orientation leads to a relatively small quantity of first (and second) fluid flowing in a direction transverse to the direction of travel of the fluid dispenser. An increase in the volume of the first fluid in display elements downstream of such a transverse flow may undesirably result in these display elements having a slightly higher fill level as compared to display elements located upstream.

To help mitigate such non-uniformity, in some embodiments, pixel walls of display elements of the arrays formed on the substrate may vary in height so as to affect flow and distribution of dispensed first and second fluids across the substrate. For example, as described in detail below, raised portions of pixel walls at right angles to fluid flow may contribute to channeling dispensed first and second fluids in directions that lead to increased uniformity of thickness of the dispensed first and second fluids across the substrate, compared to the case without raised pixel walls. Such a process of channeling the dispensed first and second fluids occurs during the dispensing process.

A fluid dispenser may include a first slit to dispense the first fluid and a second slit to dispense the second fluid. Herein, such a fluid dispenser is called a "double-slit" fluid dispenser, or merely a "fluid dispenser", though the fluid dispenser may be a "multi-slit" fluid dispenser and include more than two slits (e.g. one or more slits may be used for each fluid).

A display device, such as an electrowetting display device, can be a transmissive, reflective, or transflective display that generally includes an array of display elements (e.g., pixels or subpixels) configured to be operated by an active matrix addressing scheme. For example, rows and columns of electrowetting elements are operated by controlling voltage levels on a plurality of source lines and gate lines. In this fashion, the display device can produce an image by selecting particular display elements to transmit, reflect or block light. Display elements are addressed (e.g., selected) via rows and columns of the source lines and gate lines that are electrically connected to transistors (e.g., used as switches) included in each display element. Transistors take up a relatively small fraction of the area of each display element to allow light to efficiently pass through (or reflect from) the display element. Herein, a display element may, unless otherwise specified, comprise a pixel or subpixel of an electrowetting display device. Such a pixel or subpixel may be the smallest light transmissive element of a display that is individually operable to directly control an amount of light transmission or reflection through the element. For example, in some implementations, a display element may be a pixel that includes a red subpixel, a green subpixel, and a blue subpixel. In other implementations, a display element may be a pixel that is a smallest component, e.g., the pixel does not include any subpixels.

Electrowetting displays include an array of display elements comprising pixels and/or subpixels located between two support plates, such as a substrate and a top plate. For example, the substrate may be a support plate that, in cooperation with the top plate, contains display elements that include at least one electrode, electrowetting oil, electrolyte solution and pixel walls between the support plates. Support plates may include glass, plastic (e.g., a transparent thermoplastic such as PMMA or other acrylic), or other transparent material and may be made of a rigid or flexible material, for example.

Individual pixels are surrounded by pixel walls made, for instance, from photoresist material. Pixel walls retain at least a first fluid which is electrically non-conductive, such as opaque or colored oil, in the individual pixels. A cavity formed between the support plates is filled with the first fluid (e.g., retained by pixel walls) and a second fluid (e.g., an electrolyte solution) which is electrically conductive or polar and may be water or a salt solution such as a solution of potassium chloride water. The second fluid may be transparent, but may be colored or light absorbing. The second fluid is immiscible with the first fluid.

In addition to display elements, spacers and edge seals can also be located between two clear support plates. Hereinafter, example embodiments are described as including clear substrates or support plates that comprise glass support plates. However, support plates can comprise any of a number of transparent amorphous materials, such as plastic, glass, quartz, semiconductors, and so on, and claimed subject matter is not limited in this respect. Herein, describing an element or material as being "transparent" means that the element or material can transmit a relatively large fraction of the light incident upon it. For example, a transparent substrate or layer may transmit more than 70% or 80% of the light impinging on its surface, though claimed subject matter is not limited in this respect.

Spacers and edge seals which mechanically connect a first support plate with a second overlying support plate, or which form a separation between the first support plate and the second support plate, contribute to mechanical integrity of the electrowetting display. Edge seals, for example, being disposed along a periphery of an array of electrowetting display device elements, may contribute to retaining (e.g., first and second) fluids between the first support plate and the second overlying support plate. Spacers are desirably transparent so as to not hinder throughput of light in the electrowetting display. Transparency of spacers can at least partially depend on the refractive index of the spacer material, which should be similar to or the same as the refractive indices of surrounding media. Spacers are also desirably chemically inert to surrounding media.

In various embodiments, a display element of a display device includes, among other things, an electrode layer and a thin film transistor (TFT) that is switched to either select or deselect the electrowetting element using active matrix addressing. A TFT is a particular type of field-effect transistor that includes thin films of an active semiconductor layer as well as a dielectric layer and metallic contacts over a supporting (but non-conducting) substrate, which may be glass or any of a number of other transparent materials, for example.

In some embodiments, TFTs are fabricated onto a glass (or other transparent) substrate or top plate of an electrowetting display device. For example, TFTs may be disposed on a top surface of the glass substrate opposite the side of the substrate adjacent to the display elements, for example.

In some embodiments, a display device as described herein can comprise a portion of a system that includes one or more processors and one or more computer memories, which may reside on a control board, for example. Display software can be stored on the one or more memories and can be operable with the one or more processors to modulate light that is received from an outside source (e.g., ambient room light) or out-coupled from a light guide of the display device. For example, display software can include code executable by a processor to modulate optical properties of individual pixels of the electrowetting display based, at least in part, on electronic signals representative of image or video data. The code can cause the processor to modulate the optical properties of pixels by controlling electrical signals (e.g., voltages, currents, fields, and so on) on, over, or in layers of the electrowetting display.

Figure 1:
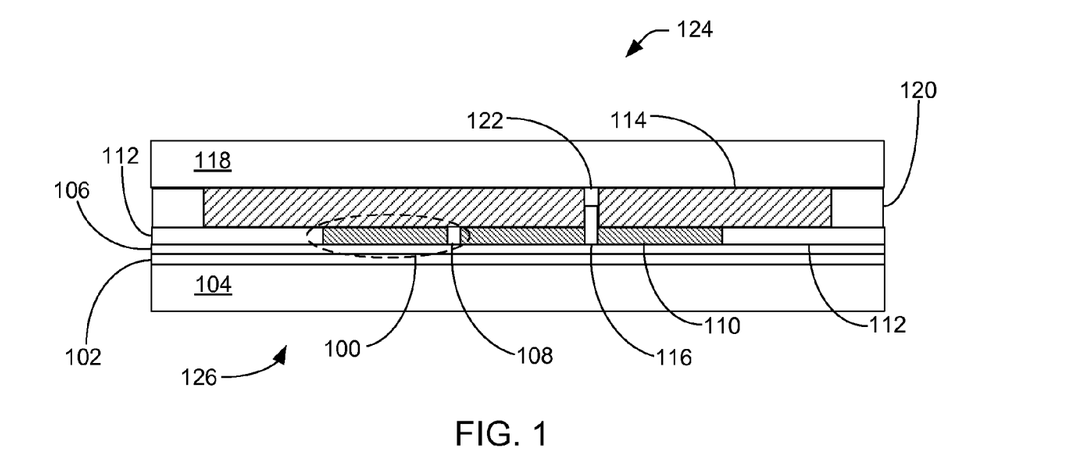
FIG. 1 illustrates a cross-section of a portion of an electrowetting display device, according to some embodiments.

FIG. 1 is a cross-section of a portion of an electrowetting display device illustrating several electrowetting elements 100, according to some embodiments. An electrode layer 102 is formed on a substrate 104 (e.g., a glass substrate). In some implementations, a dielectric barrier layer (not illustrated) may at least partially separate electrode layer 102 from a hydrophobic layer 106 also formed on substrate 104. In some implementations, hydrophobic layer 106 can comprise a fluoropolymer, such as AF1600, produced by DuPont, based in Wilmington, Del. Hydrophobic layer 106 can also be any of a number of water-repelling materials that affect wettability of an adjacent material, for example. Pixel walls 108 form a patterned electrowetting element grid on hydrophobic layer 106. Pixel walls 108 may comprise a photoresist material, such as epoxy-based negative photoresist SU-8. The patterned electrowetting element grid comprises rows and columns that form an array of electrowetting elements. For example, an electrowetting element can have a width and length in a range of about 50 to 500 microns.

A first fluid 110, which can have a thickness (e.g., depth) in a range of about 1 to 10 microns, for example, overlies hydrophobic layer 106. First fluid 110 is partitioned by pixel walls 108 of the patterned electrowetting element grid. An outer rim 112 can comprise the same material as pixel walls 108. A second fluid 114, such as an electrolyte solution, overlies first fluid 110 and pixel walls 108 of the patterned electrowetting element grid. An electrolyte solution can be electrically conductive or polar. For example, an electrolyte solution may be, among other things, water or a salt solution such as potassium chloride water.

In some embodiments, the electrowetting display device may comprise raised pixel walls 116 that are taller than "normal-height" pixel walls 108. For example, raised pixel walls 116 may extend further upward into second fluid 114 as compared to pixel walls 108. As another way of describing these relatively tall pixel walls, raised pixel walls 116 may extend further from substrate 104 as compared to pixel walls 108.

A top plate 118 covers second fluid 114 and edge seals 120 retain second fluid 114 over the electrowetting element array. Top plate 116 may be supported by edge seals 118 and spacers 122 that are interspersed throughout the array of display elements 100. The substrate and the top plate may be made of glass or polymer and may be rigid or flexible, for example. In some implementations, raised pixel walls 116 may extend up to top plate 118, thus having a same or similar height as that of spacers 122. For example, some or all spacers 122 may be located over at least a portion of the regions where pixel walls 108 or 116 intersect, though claimed subject matter is not limited in this respect. In such implementations, both spacers 122 and raised pixel walls 116 may contribute to mechanical integrity of the electrowetting display device by providing support to top plate 118.

A voltage V applied across, among other things, second fluid 114 and electrode 102 of individual electrowetting elements can control transmittance or reflectance of the individual electrowetting elements.

The display device has a viewing side 124 on which an image formed by the electrowetting display device can be viewed, and a rear side 126. Top plate 118 faces viewing side 124 and substrate 104 faces rear side 126. In an alternative embodiment, the electrowetting display device may be viewed from rear side 126. The electrowetting display device may be a reflective, transmissive or transflective type. The electrowetting display device may be a segmented display type in which the image is built up of segments. The segments can be switched simultaneously or separately. Each segment includes one electrowetting element 100 or a number of electrowetting elements 100 that may be neighboring or distant from one another. Electrowetting elements 100 included in one segment are switched simultaneously, for example. The electrowetting display device may also be an active matrix driven display type or a passive matrix driven display, just to name a few examples.

Second fluid 114 is immiscible with first fluid 110. Herein, substances are immiscible with one another if the substances do not substantially form a solution. Second fluid 114 is electrically conductive or polar, and may be water or a salt solution such as a solution of potassium chloride in a mixture of water and ethyl alcohol, for example. Second fluid 114 is preferably transparent, but may be colored or light absorbing. First fluid 110 is electrically non-conductive and may for instance be an alkane like hexadecane or (silicone) oil. Hydrophobic layer 106 is arranged on substrate 104 to create an electrowetting surface area. The hydrophobic character causes first fluid 110 to adhere preferentially to substrate 104 since first fluid 110 has a higher wettability with respect to the surface of hydrophobic layer 106 than second fluid 114. Wettability relates to the relative affinity of a fluid for the surface of a solid. Wettability increases with increasing affinity, and it can be measured by the contact angle formed between the fluid and the solid and measured internal to the fluid of interest. For example, such a contact angle can increase from relative non-wettability of more than 90° to complete wettability at 0°, in which case the fluid tends to form a film on the surface of the solid.

First fluid 110 absorbs at least a part of the optical spectrum. First fluid 110 may be transmissive for a part of the optical spectrum, forming a color filter. For this purpose, the fluid may be colored by addition of pigment particles or dye, for example. Alternatively, first fluid 110 may be black (e.g., absorbing substantially all parts of the optical spectrum) or reflecting. Hydrophobic layer 106 may be transparent or made to be reflective. A reflective layer may reflect the entire visible spectrum, making the layer appear white, or part of it, making it have a color.

When a voltage is applied across electrowetting element 100, electrowetting element 100 will enter into an active state. Electrostatic forces will impart motion to the second fluid 114 toward electrode layer 102, thereby repelling first fluid 110 from the area of hydrophobic layer 106 to pixel walls 108 surrounding the area of hydrophobic layer 106, to a droplet-like form. This action uncovers first fluid 110 from the surface of hydrophobic layer 106 of electrowetting element 100. When the voltage across electrowetting element 100 is returned to an in-active signal level of zero or a value near to zero, electrowetting element 100 will return to an inactive state, where first fluid 110 flows back to cover hydrophobic layer 106. In this way, first fluid 110 forms an electrically controllable optical switch in each electrowetting element 100. Of course, such details of an electrowetting display device are merely examples, and claimed subject matter is not limited in this respect.

Figure 2:
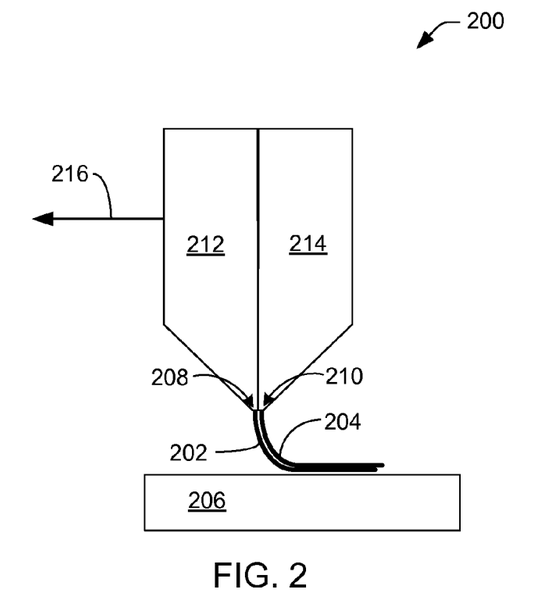
FIG. 2 illustrates a side view of a double-slit fluid dispenser, according to some embodiments.

FIG. 2 illustrates a side view of a double-slit fluid dispenser 200, according to some embodiments. Fluid dispenser 200 is configured to dispense a first fluid 202 (e.g., an opaque oil) and a second fluid 204 (e.g., an electrolyte solution) onto a substrate 206 that includes one or more display element arrays (not illustrated in FIG. 2). For example, a portion of such a substrate may be the same or similar to substrate 104 illustrated in FIG. 1. In some implementations, first fluid 202 and second fluid 204 may be the same as or similar to first fluid 110 and second fluid 114, respectively, shown in FIG. 1. Fluid dispenser 200 may include a first slit 208 for dispensing first fluid 202 and a second slit 210 for dispensing second fluid 204. In some implementations, the first fluid may be transiently contained in first reservoir 212 and the second fluid may be transiently contained in second reservoir 214. A distance between first slit 208 and second slit 210 may be in the order of several millimeters, for example, though claimed subject matter is not limited in this respect. Lengths (e.g., as measured into and out of the page of FIG. 2) of first slit 208 and second slit 210 may range from several centimeters to about 40 centimeters, just to give some examples. In particular, the lengths of the slits are sufficient to at least approximately span the width of the substrate onto which fluid dispenser 200 dispenses the first and second fluids.

During a fabrication process for placing the first and second fluids in display element arrays formed on a substrate, fluid dispenser 200 moves in a direction 216 relative to the underlying substrate 206. Fluid dispenser 200 dispenses first fluid 202 into the display element arrays' individual display elements, which retain the first fluid by their respective pixel walls. Fluid dispenser 200 dispenses second fluid 204 so as to cover the first fluid and the individual display elements.

Figure 3:
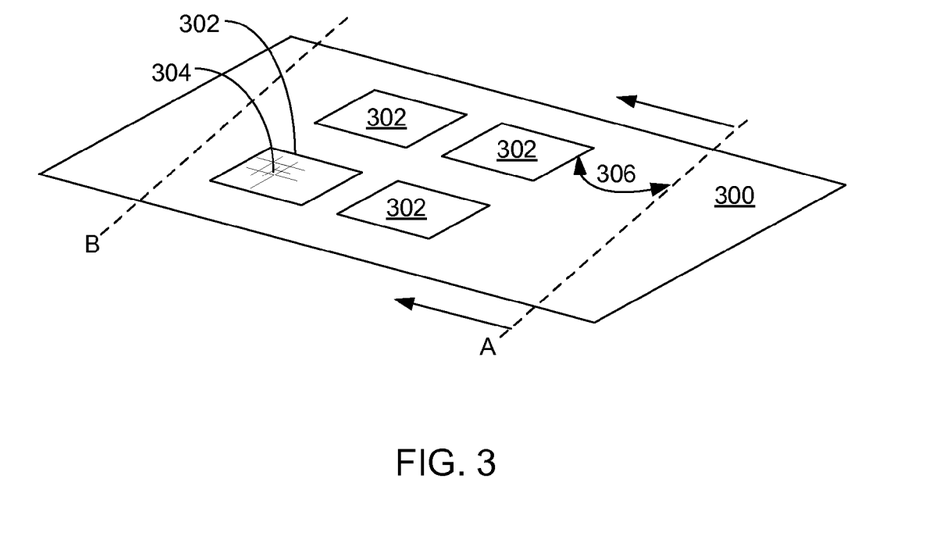
FIGS. 3 and 4 illustrate perspective views of a substrate with display element arrays formed thereon, according to some embodiments.

FIG. 3 illustrates a perspective view of a substrate 300 with display element arrays 302 formed thereon, according to some embodiments. Although four display element arrays 302 are illustrated in the figures (e.g., four being batch-processed together), any number is possible. For example, the four display element arrays 302 will later be cut into individual portions so as to become four display devices. These four individual portions will include portions of substrate 300, first and second fluids, and portions of a top plate overlying each of the four display element arrays 302. Accordingly, portions of substrate 300 underlying individual display element arrays 302 will later become a permanent part of the individual display devices (e.g., as a substrate such as 104 illustrated in FIG. 1). Display element arrays 302 include a relatively large number (e.g., thousands or millions) of individual display elements 304 (e.g., pixels or subpixels), as depicted by a few orthogonal lines in FIG. 3 to indicate the presence of rows and columns of display elements 304.

A double-slit fluid dispenser, such as 200 illustrated in FIG. 2, for example, may be placed over substrate 300 anywhere between positions "A" and "B", indicated in FIG. 3. Such a double-slit fluid dispenser is configured to dispense a first fluid and a second fluid onto substrate 300 and display element arrays 302. In particular, the double-slit fluid dispenser dispenses the first and second fluids as the double-slit fluid dispenser moves over substrate 300 (and display element arrays 302).

In some embodiments, the double-slit fluid dispenser may be oriented in a rotated position relative to rows and columns of display element arrays 302. For example, the double-slit fluid dispenser may subtend an angle 306 relative to rows (or columns) of display element arrays 302. Angle 306 may be in a range of about 5 degrees to about 30 degrees, though claimed subject matter is not limited in this respect. The double-slit fluid dispenser being at a skewed angle relative to display element arrays 302 can lead to improved uniformity of distribution of the first fluid in individual display elements 304 after a process of filling using the double-slit fluid dispenser. Such a skewed orientation allows for a relatively smooth fluid flow transition as the first fluid flows from one row of display elements into the next row of display elements.

Figure 4:
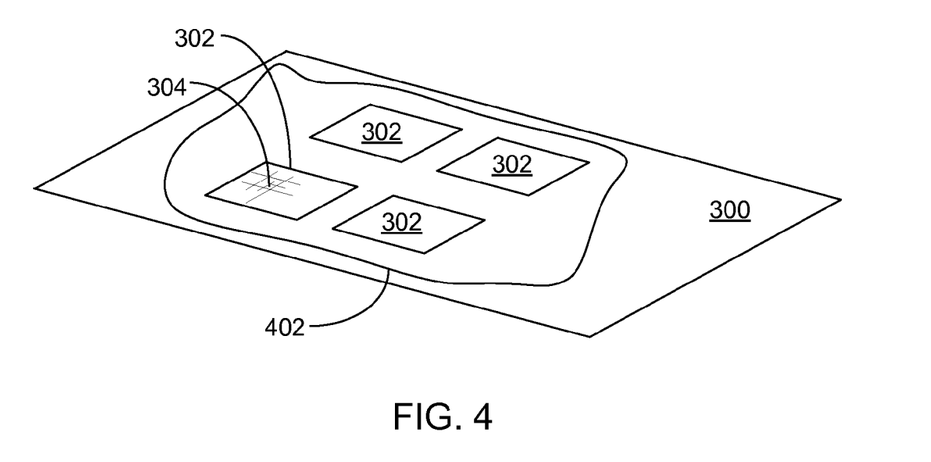

FIG. 4 illustrates a perspective view of substrate 300 after the double-slit fluid dispenser passed across substrate 300 while dispensing the first fluid and the second fluid. Individual display elements 304 of arrays 302 are at least partially filled with the first fluid. The first fluid is dispensed relatively uniformly by the double-slit fluid dispenser so that the first fluid at least partially and evenly fills the display elements. The second fluid subsequently covers the partially filled display element arrays (at least partially filled with the first fluid) and a substantial portion of substrate 300, forming a second fluid puddle 402.

Subsequent to the situation depicted in FIG. 4, substrate 300 and display element arrays 302 formed thereon may be covered by a top plate, such as 118 shown in FIG. 1. Even though pixel walls may have unequal heights, such a top plate may be supported by spacers, such as 122, shown in FIG. 1, that may extend at least as high as the highest pixel wall, for example. The resulting structure may be placed in a roller to squeeze out excess fluids (e.g., particularly the second fluid, such as electrolyte solution) and to laminate the top plate onto display element arrays 302. This lamination process also squeezes the top plate toward substrate 300 so that the top plate becomes supported by the structures, such as edge seals and spacers (e.g., edge seals 120 and spacers 122 illustrated in FIG. 1) previously formed on substrate 300. Consequently, while the first fluid is substantially retained within individual display elements 304, the second fluid is retained in the display element array 302 by the edge seals in cooperation with the substrate and the top plate. Subsequent to the laminating process, individual display element arrays 302, and portions of the top plate laminated to individual display element arrays 302, can be partitioned by cutting the structure at or near peripheries of the display element arrays, for example.

Figure 5:
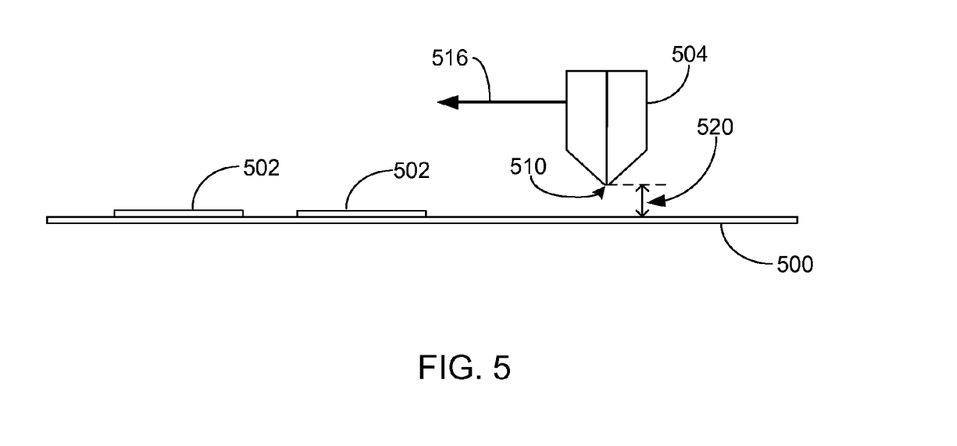
FIGS. 5 and 6 illustrate top views of a substrate with display element arrays formed thereon and a double-slit fluid dispenser, according to some embodiments.
Figure 6:
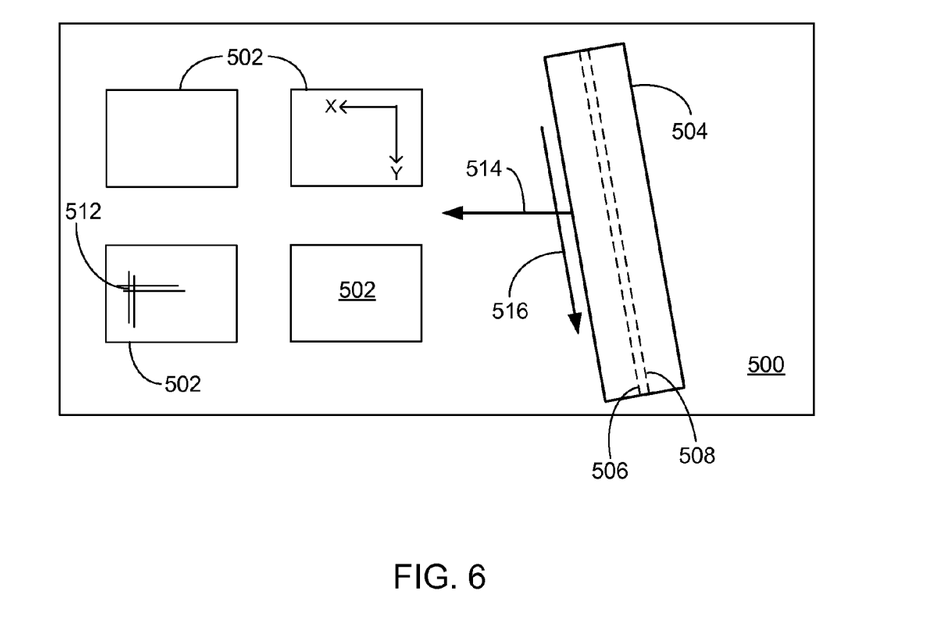

FIGS. 5 and 6 illustrate side and top views, respectively, of a substrate 500 with display element arrays 502 formed thereon, according to some embodiments. Also illustrated is a double-slit fluid dispenser 504 that includes a first slit 506 and a second slit 508 in a region 510 for dispensing first and second fluids. This configuration is the same or similar to that illustrated in FIGS. 3 and 4. Display element arrays 502 include a relatively large number of individual display elements 512. Portions of substrate 500 underlying individual display element arrays 502 will later become a permanent part of display devices (e.g., as a substrate such as 104 illustrated in FIG. 1). Double-slit fluid dispenser 504, which is similar to or the same as 200 illustrated in FIG. 2, for example, is initially placed over substrate 500 in preparation to dispense first and second fluids onto substrate 500 and display element arrays 502. Double-slit fluid dispenser 504 is oriented at a skewed angle (e.g., a non-orthogonal angle) relative to rows and columns of display element arrays 502, as explained below. When double-slit fluid dispenser 504 is set into motion over display element arrays 502, as indicated by arrow 514, double-slit fluid dispenser 504 dispenses the first fluid from slit 506 and the second fluid from slit 508 onto substrate 500 and display element arrays 502.

FIG. 6 includes orthogonal reference axes "X" and "Y". For example, the X-axis is parallel to rows of display elements 512 and represents a direction of travel 514 of double-slit fluid dispenser 504. The Y-axis is parallel to columns of display elements 512 and represents a direction that is transverse to such a direction of travel. In particular, double-slit fluid dispenser 504 dispenses the first and second fluids as the double-slit fluid dispenser moves over substrate 500 (and display element arrays 502) along the X-axis. However, slits 506 and 508 are at a skewed angled from the X-axis so that display elements are filled with the first fluid at an angle. As explained above, such an angle can lead to uniform filling of the display elements. By being angled, however, double-slit fluid dispenser 504 can lead to a net flow of fluid transversely, across substrate 500. For example, such a net flow may be substantially parallel with the first and second slits 506 and 508, as indicated by arrow 516. Undesirably, such a net transverse flow of fluid can lead to uneven filling of display elements by the first fluid. For example, display elements 512 toward the lower regions (e.g., in the Y-axis direction) of substrate 502 may receive more first fluid as compared to display elements in the upper regions (e.g., in the negative Y-axis direction) of the substrate.

As mentioned above, uniformity of the first fluid in the display elements subsequent to a fill process is an important aspect of fabrication. Thus, in embodiments described below, pixel walls of the display elements 512 are configured to redirect a flow of fluids from a direction along the Y-axis to a direction along the X-axis, which is the same as the travel direction of double-slit fluid dispenser 504. Such a fluid flow in the X-direction helps reduce transverse fluid flow in the Y-direction. For example, fluid flowing in the Y-direction may encounter raised pixel walls and subsequently deviate toward the X-direction. Reducing the transverse fluid flow can improve filling uniformity of the display elements 512.

Double-slit fluid dispenser 504 may move across substrate 500 and display element arrays 502 at a height 520 so that double-slit fluid dispenser 504 is about 150 microns above non-raised pixel walls (such as pixel walls 108, illustrated in FIG. 1) of display element arrays 502. Raised pixel walls, such as 116 in FIG. 1, may be less than 50 to 250 microns from double-slit fluid dispenser 504.

Figure 7:
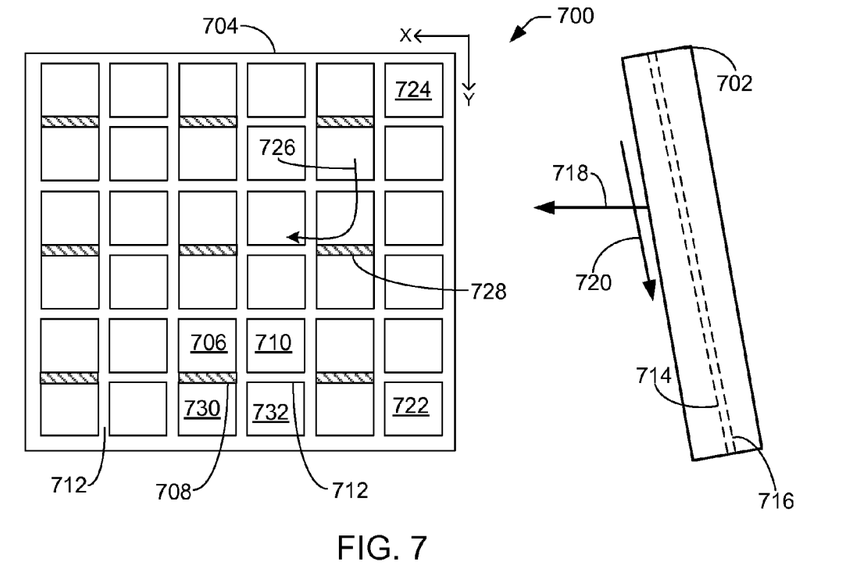
FIGS. 7-10 illustrate top views of portions of an array of display elements having raised pixel walls and a double-slit fluid dispenser, according to some embodiments.

FIG. 7 illustrates a top view of a portion 700 of an array of display elements having raised pixel walls and a double-slit fluid dispenser 702, according to some embodiments. Double-slit fluid dispenser 702 is configured to dispense a first fluid (e.g., an opaque oil) and a second fluid (e.g., an electrolyte solution) onto substrate 704 that includes one or more display element arrays that include display elements 706 having at least one raised pixel wall 708 and display elements 710 having a non-raised pixel wall 712. In some implementations, raised pixel wall 708 and non-raised pixel wall 712 may comprise the same material, such as photoresist material, which may be formed by a single deposition/masking process, for example. A portion of substrate 704 may be the same or similar to substrate 104 illustrated in FIG. 1. Fluid dispenser 702 may include a first slit 714 for dispensing the first fluid and a second slit 716 for dispensing the second fluid. A distance between first slit 714 and second slit 716 may be in a range of about 1 to 5 millimeters, for example. Lengths (e.g., as measured into and out of the page of FIG. 7) of first slit 714 and second slit 716 may range from several centimeters to about 40 centimeters, just to give an example. In particular, the lengths of the slits are sufficient to at least approximately span the width of the substrate onto which fluid dispenser 702 dispenses first and second fluids.

During a fabrication process for placing first and second fluids in display element arrays formed on substrate 704, fluid dispenser 702 moves in a direction 718 relative to the underlying substrate. This direction is parallel to the X-axis shown in the figure, though fluid dispenser 702 is oriented at a skewed angle relative to the X-axis. The X-axis and the Y-axis represent alignment of rows and columns of the display elements in the arrays. Fluid dispenser 702 dispenses the first fluid into individual display elements 706 and 710 of the display element arrays. Fluid dispenser 702 dispenses the second fluid so as to cover the first fluid and the at least partially filled individual display elements.

As mentioned above, due at least in part to fluid dispenser 702 being oriented at a skewed angle, a net flow of first and second fluids develops in a transverse direction, which is shown at least approximately by arrow 720. This transverse fluid flow may lead to a distribution of first and second fluids that increases in the Y-axis direction. For example, display element 722 may be filled to a greater depth with the first fluid compared to a fill depth of pixel 724. To mitigate such uneven distribution of first and second fluids that arises due in part to the skewed orientation of fluid dispenser 702, portions of pixel walls of the array of display elements are taller than other portions of the pixel walls. The taller pixel walls may redirect fluid flow. For example, arrow 726 represents flow of fluid initially flowing parallel to the Y-axis that is re-directed toward the X-axis by raised pixel wall 728. Such re-directing of fluid flow from one direction to another (e.g., from flow along the Y-axis to flow along the X-axis) can help mitigate non-uniform distribution of fluids dispensed from fluid dispenser 702 oriented at a skewed angle.

For example, display element 706 includes raised pixel wall 708, whereas display element 710 does not include a raised pixel wall, and instead is surrounded by "normal-height" pixel walls 712 having heights less than those of raised pixel walls 708. In some implementations, raised pixel walls 708 may be about twice as tall as pixel walls 712, which may be about 4 microns tall. In other implementations, raised pixel walls 708 may extend further from substrate 704 than pixel walls 712 by a factor in the range of about 1.5 to about 4.0, for example. In still other implementations, raised pixel walls 708 may extend a same distance from substrate 704 as spacers, such as 122 shown in FIG. 1, for example.

In the embodiment shown in FIG. 7, raised pixel walls 708 are distributed across the array of display elements so that every other pair of neighboring display elements in rows of the array shares a raised pixel wall. For example, the pair of display elements 706 and 730 share raised pixel wall 708. In contrast, the pair of display elements 710 and 732 share a non-raised (e.g., "normal-height") pixel wall 712. Such a distribution of raised pixel walls is merely one example of a number of possible distributions. Placement or distribution of raised pixel walls may be determined based, at least in part, on fluid dynamics of the first and/or second fluids with respect to features and structures of the display elements formed on substrate 704. Fluid dynamics may depend, at least in part, on viscosity, wettability, and rate and angle of dispensing of the first and/or second fluids relative to the substrate and structures formed thereon, just to name a few examples.

Figure 8:
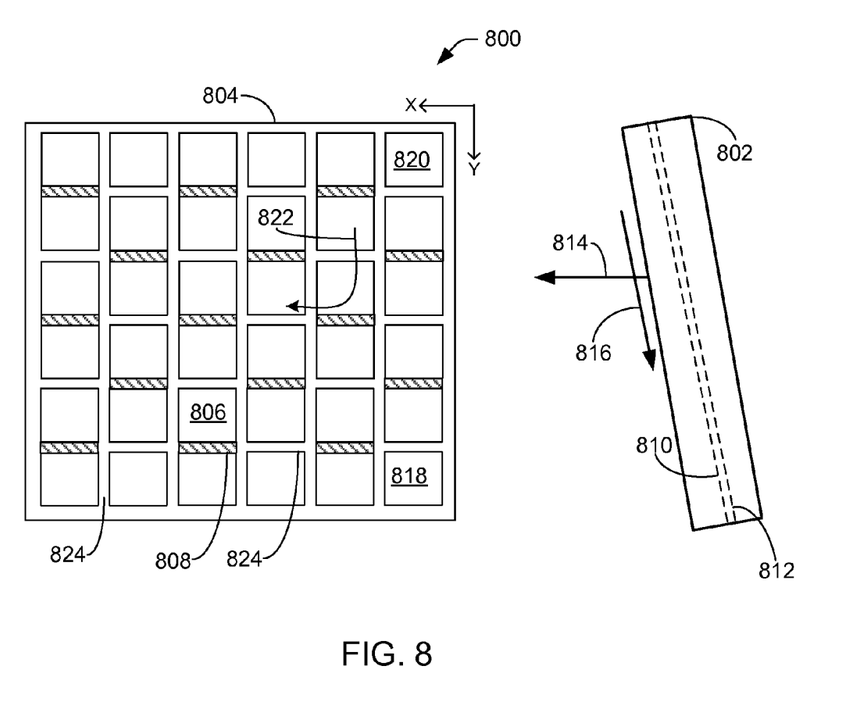

FIG. 8 illustrates a top view of a portion 800 of an array of display elements having raised pixel walls and a double-slit fluid dispenser 802, according to some embodiments. Portion 800 is similar to portion 700 of the array of display elements illustrated in FIG. 7, except that portion 800 includes a different distribution of raised pixels walls, for example.

Double-slit fluid dispenser 802 is configured to dispense a first fluid (e.g., an opaque oil) and a second fluid (e.g., an electrolyte solution) onto substrate 804 that includes one or more display element arrays that include display elements 806 having at least one raised pixel wall 808. For example, a portion of such a substrate may be the same or similar to substrate 104 illustrated in FIG. 1. Fluid dispenser 802 may include a first slit 810 for dispensing the first fluid and a second slit 812 for dispensing the second fluid. A distance between first slit 810 and second slit 812 may be in a range of about 1 to 5 millimeters, for example. Lengths (e.g., as measured into and out of the page of FIG. 7) of first slit 810 and second slit 812 may range from several centimeters to about 40 centimeters, just to give an example. In particular, the lengths of the slits may be sufficient to at least approximately span the width of the substrate onto which fluid dispenser 802 dispenses first and second fluids.

During a fabrication process for placing first and second fluids in display element arrays formed on substrate 804, fluid dispenser 802 moves in a direction 814 relative to the underlying substrate. This direction is parallel to the X-axis shown in the figure, though fluid dispenser 802 is oriented at a skewed angle relative to the X-axis. The X-axis and the Y-axis represent alignment of rows and columns of the display elements in the arrays. Fluid dispenser 802 dispenses the first fluid into individual display elements 806 of the display element arrays. Fluid dispenser 802 dispenses the second fluid so as to cover the first fluid and the at least partially filled individual display elements.

As mentioned above, due at least in part to fluid dispenser 802 being oriented at a skewed angle, a net flow of first and second fluids develops in a transverse direction, which is shown at least approximately by arrow 816. This transverse fluid flow may lead to a distribution of first and second fluids that increases in the Y-axis direction. For example, display element 818 may be filled to a greater depth with the first fluid compared to a fill depth of pixel 820. To mitigate such uneven distribution of first and second fluids that arises due in part to the skewed orientation of fluid dispenser 802, portions of pixel walls of the array of display elements are taller than other portions of the pixel walls. The taller pixel walls may redirect fluid flow. For example, arrow 822 represents flow of fluid initially flowing parallel to the Y-axis that is re-directed toward the X-axis by raised pixel wall 808 that is at substantially a right angle to the fluid flow 822. Such re-directing flow of fluid from one direction to another (e.g., from flow along the Y-axis to flow along the X-axis) can help mitigate non-uniform distribution of fluids dispensed from fluid dispenser 802 oriented at a skewed angle.

In the example implementation shown in FIG. 8, display element 806 includes raised pixel wall 808 and "normal-height" pixel walls 824 having heights less than those of raised pixel walls 808. In some implementations, raised pixel walls 808 may be about twice as tall as pixel walls 824, which may be about 4 microns tall.

Raised pixel walls 808 are distributed across the array of display elements so that every other pixel wall partitioning neighboring display elements in rows and columns of the array comprises a raised pixel wall. Such a distribution of raised pixel walls is merely one example of a number of possible distributions. As mentioned above, placement or distribution of raised pixel walls may be determined based, at least in part, on fluid dynamics of the first and/or second fluids with respect to features and structures of the display elements formed on substrate 804.

Figure 9:
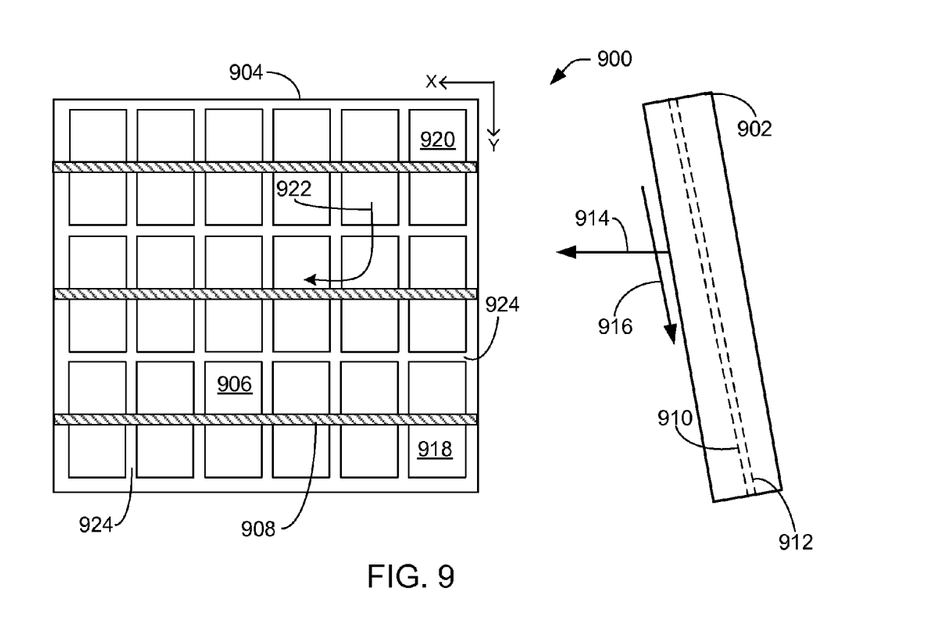

FIG. 9 illustrates a top view of a portion 900 of an array of display elements having raised pixel walls and a double-slit fluid dispenser 902, according to some embodiments. Portion 900 is similar to portion 700 of the array of display elements illustrated in FIG. 7, except that portion 900 includes a different distribution of raised pixels walls, for example.

Double-slit fluid dispenser 902 is configured to dispense a first fluid and a second fluid onto substrate 904 that includes one or more display element arrays that include display elements 906 having at least one raised pixel wall 908. Fluid dispenser 902 may include a first slit 910 for dispensing the first fluid and a second slit 912 for dispensing the second fluid.

During a fabrication process for placing first and second fluids in display element arrays formed on substrate 904, fluid dispenser 902 moves in a direction 914 relative to the underlying substrate. This direction is parallel to the X-axis shown in the figure, though fluid dispenser 902 is oriented at a skewed angle relative to the X-axis. The X-axis and the Y-axis represent alignment of rows and columns of the display elements in the arrays. Fluid dispenser 902 dispenses the first fluid into individual display elements 906 of the display element arrays. Fluid dispenser 902 dispenses the second fluid so as to cover the first fluid and the at least partially filled individual display elements.

As mentioned above, due at least in part to fluid dispenser 902 being oriented at a skewed angle, a net flow of first and second fluids develops in a transverse direction, which is shown at least approximately by arrow 916. This transverse fluid flow may lead to a distribution of first and second fluids that increases in the Y-axis direction. For example, display element 918 may be filled to a greater depth with the first fluid compared to a fill depth of pixel 920. To mitigate such uneven distribution of first and second fluids that arises due in part to the skewed orientation of fluid dispenser 902, portions of pixel walls of the array of display elements are taller than other portions of the pixel walls. The taller pixel walls may redirect fluid flow. For example, arrow 922 represents flow of fluid initially flowing parallel to the Y-axis that is re-directed toward the X-axis by raised pixel wall 908 that is at substantially a right angle to the fluid flow 922. Such re-directing flow of fluid from one direction to another (e.g., from flow along the Y-axis to flow along the X-axis) can help mitigate non-uniform distribution of fluids dispensed from fluid dispenser 902 oriented at a skewed angle.

In the example implementation shown in FIG. 9, display element 906 includes raised pixel wall 908 and "normal-height" pixel walls 924 having heights less than those of raised pixel walls 908. In some implementations, raised pixel walls 908 may be about twice as tall as pixel walls 924, which may be about 4 microns tall.

Raised pixel walls 908 are distributed across the array of display elements so that every other row of pixel walls of the array comprises a raised pixel wall. Such a distribution of raised pixel walls is merely one example of a number of possible distributions. As mentioned above, placement or distribution of raised pixel walls may be determined based, at least in part, on fluid dynamics of the first and/or second fluids with respect to features and structures of the display elements formed on substrate 904.

Figure 10:
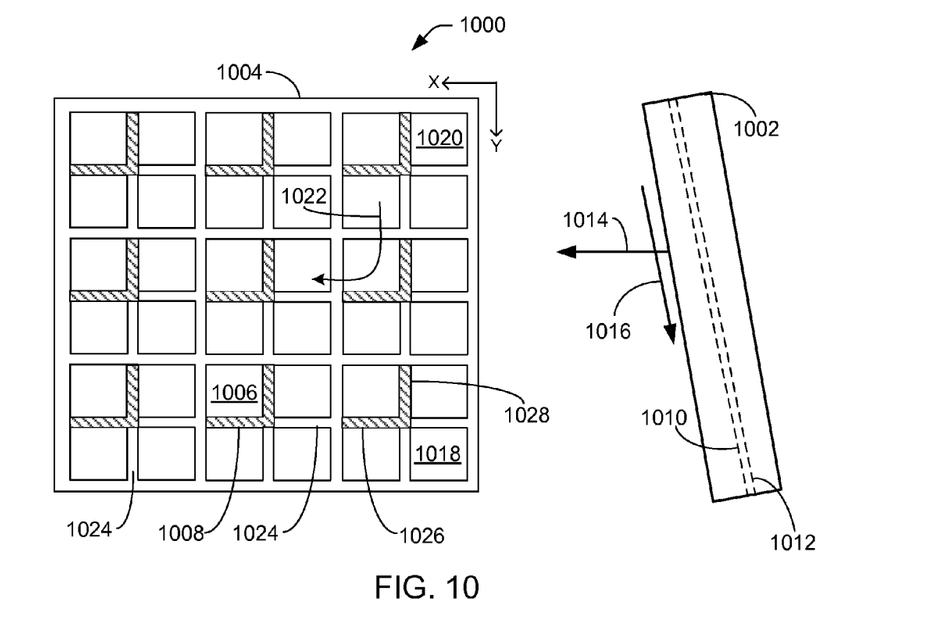

FIG. 10 illustrates a top view of a portion 1000 of an array of display elements having raised pixel walls and a double-slit fluid dispenser 1002, according to some embodiments. Portion 1000 is similar to portion 700 of the array of display elements illustrated in FIG. 7, except that portion 1000 includes "L"-shaped raised pixels walls, for example.

Double-slit fluid dispenser 1002 is configured to dispense a first fluid and a second fluid onto substrate 1004 that includes one or more display element arrays that include display elements 1006 having at least one raised pixel wall 1008. Fluid dispenser 1002 may include a first slit 1010 for dispensing the first fluid and a second slit 1012 for dispensing the second fluid.

During a fabrication process for placing first and second fluids in display element arrays formed on substrate 1004, fluid dispenser 1002 moves in a direction 1014 relative to the underlying substrate. This direction is parallel to the X-axis shown in the figure, though fluid dispenser 1002 is oriented at a skewed angle relative to the X-axis. The X-axis and the Y-axis represent alignment of rows and columns of the display elements in the arrays. Fluid dispenser 1002 dispenses the first fluid into individual display elements 1006 of the display element arrays. Fluid dispenser 1002 dispenses the second fluid so as to cover the first fluid and the at least partially filled individual display elements.

As mentioned above, due at least in part to fluid dispenser 1002 being oriented at a skewed angle, a net flow of first and second fluids develops in a transverse direction, which is shown at least approximately by arrow 1016. This transverse fluid flow may lead to a distribution of first and second fluids that increases in the Y-axis direction. For example, display element 1018 may be filled to a greater depth with the first fluid compared to a fill depth of pixel 1020. To mitigate such uneven distribution of first and second fluids that arises due in part to the skewed orientation of fluid dispenser 1002, portions of pixel walls of the array of display elements are taller than other portions of the pixel walls. The taller pixel walls may redirect fluid flow. For example, arrow 1022 represents flow of fluid initially flowing parallel to the Y-axis that is re-directed toward the X-axis by raised pixel wall 1008 that is at substantially a right angle to the fluid flow 1022. Such re-directing flow of fluid from one direction to another (e.g., from flow along the Y-axis to flow along the X-axis) can help mitigate non-uniform distribution of fluids dispensed from fluid dispenser 1002 oriented at a skewed angle.

In the example implementation shown in FIG. 10, display element 1006 includes raised pixel wall 1008 and "normal-height" pixel walls 1024 having heights less than those of raised pixel walls 1008. In some implementations, raised pixel walls 1008 may be about twice as tall as pixel walls 1024, which may be about 4 microns tall. In other implementations, raised pixel walls may vary in height. For example, portions 1026 of raised pixel walls in the X-direction (e.g., along rows) may have a different raised height compared to portions 1028 of raised pixel walls in the Y-direction (e.g., along columns).

Raised pixel walls 1008 may be distributed in any of a number of configurations. As mentioned above, placement or distribution of raised pixel walls may be determined based, at least in part, on fluid dynamics of the first and/or second fluids with respect to features and structures of the display elements formed on substrate 1004.

Figure 11:
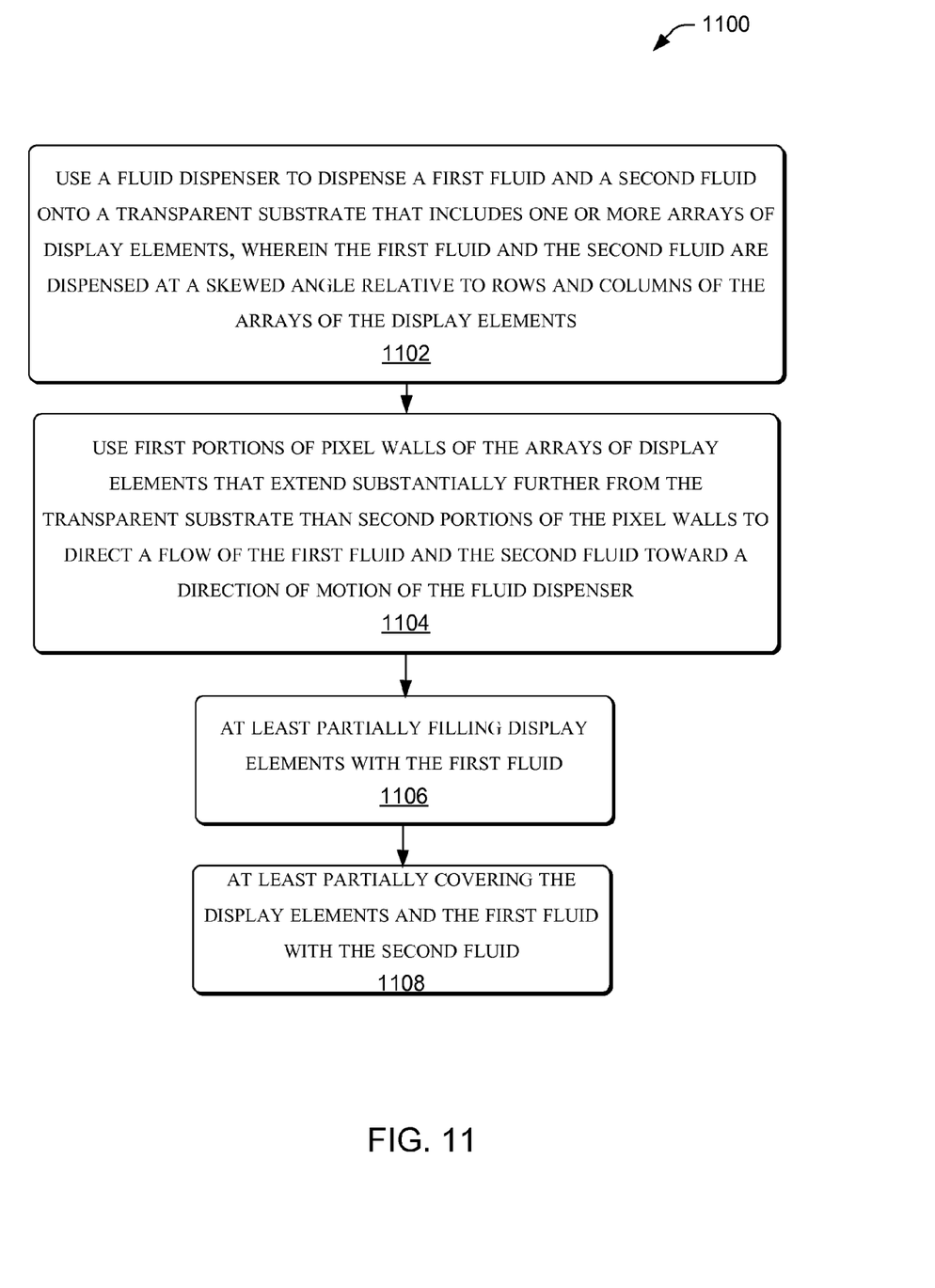
FIG. 11 is a flow diagram of a process for fabricating an electrowetting display device, according to various example embodiments.

FIG. 11 is a flow diagram of a process for fabricating an electrowetting display device, according to various embodiments. For example, the display device may be the same as or similar to the display device illustrated in FIG. 1. At block 1102, a fluid dispenser is used to dispense a first fluid and a second fluid onto a substrate, which may be transparent, that includes one or more arrays of display elements. For example, such a double-slit fluid dispenser may be similar to 200, illustrated in FIG. 2. The fluid dispenser, which may be a double-slit fluid dispenser, may dispense a first fluid, such as an opaque oil, and a second fluid, such as an electrolyte solution. The fluid dispenser may dispense the first fluid and the second fluid at a skewed angle relative to rows and columns of the arrays of the display elements.

At block 1104, first portions of pixel walls of the arrays of display elements that extend substantially further from the transparent substrate than second portions of the pixel walls are used to redirect of flow of the first fluid and the second fluid toward a direction of motion of the fluid dispenser. At block 1106, display elements of the arrays are at least partially filled with the first fluid. Pixel walls of the individual display elements retain the first fluid to the individual display elements. At block 1108, the display elements and the first fluid are at least partially covered with the second fluid. Subsequent to process 1100, a top plate may be placed over, and laminated to, the substrate and the arrays of display elements. The resulting structure may be partitioned into individual display devices.

Figure 12:
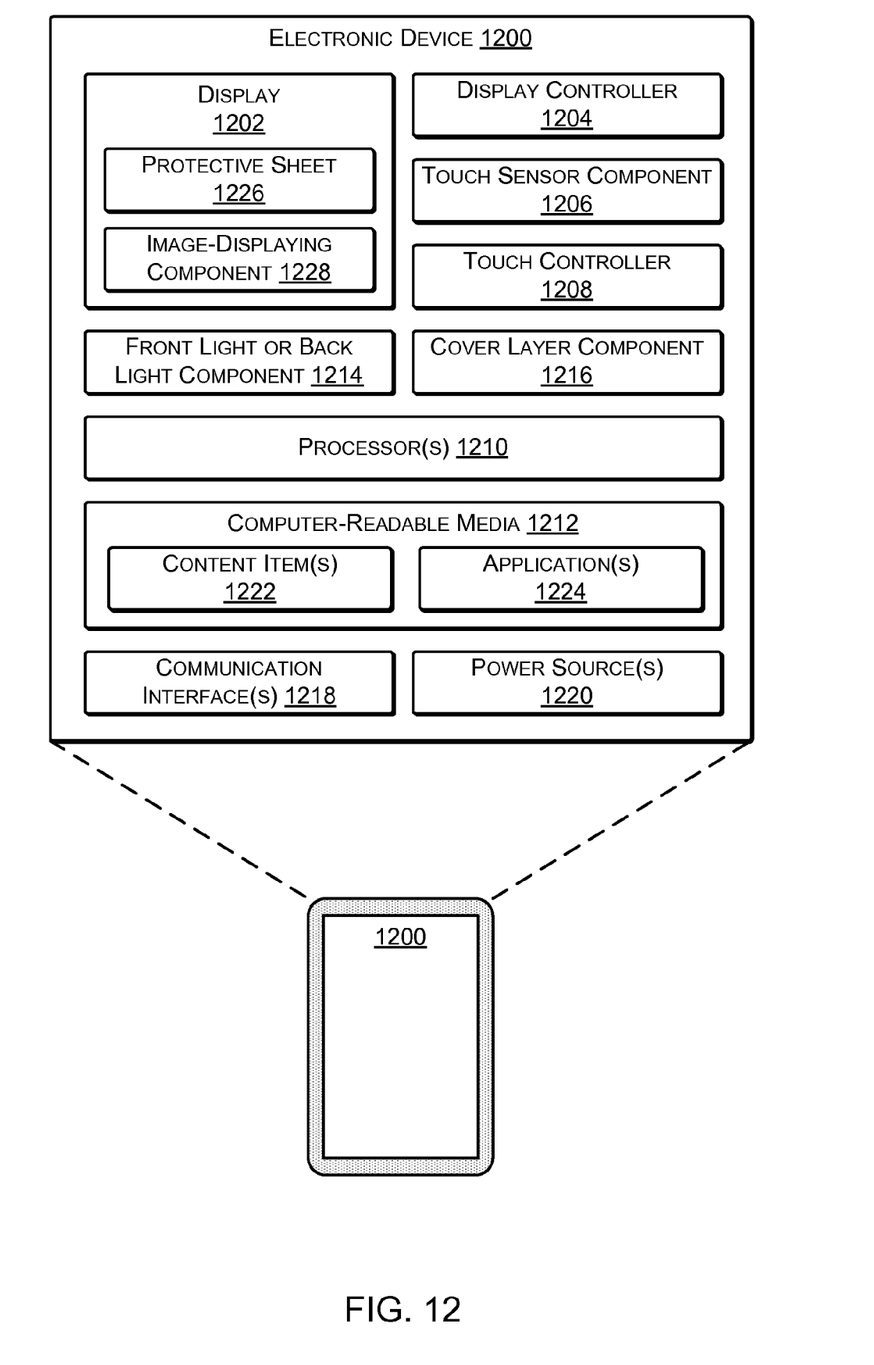
FIG. 12 illustrates an example electronic device that may incorporate a display device, according to some embodiments.

FIG. 12 illustrates an example electronic device 1200 that may incorporate any of the display devices discussed above. The device 1200 may comprise any type of electronic device having a display. For instance, the device 1200 may be a mobile electronic device (e.g., an electronic book reader, a tablet computing device, a laptop computer, a smart phone or other multifunction communication device, a portable digital assistant, a wearable computing device, an automotive display, etc.). Alternatively, the device 1200 may be a non-mobile electronic device (e.g., a computer display, a television, etc.). In addition, while FIG. 12 illustrates several example components of the electronic device 1200, it is to be appreciated that the device 1200 may also include other conventional components, such as an operating system, system busses, input/output components, and the like. Further, in other examples, such as in the case of a television or computer monitor, the electronic device 1200 may only include a subset of the components illustrated.

Regardless of the specific implementation of the electronic device 1200, the device 1200 includes a display 1202 and a corresponding display controller 1204. The display 1202 may represent a reflective or transmissive display in some instances, such as an electronic paper display, a reflective or transmissive LCD display, or the like. Electronic paper displays represent an array of display technologies that largely mimic the look of ordinary ink on paper. In contrast to conventional backlit displays, electronic paper displays typically reflect light, much as ordinary paper does. In addition, electronic paper displays are often bi-stable, meaning that these displays are capable of holding text or other rendered images even when very little or no power is supplied to the display. Some examples of the display 1202 that may be used with the implementations described herein include bi-stable LCD displays, micro electromechanical system (MEMS) displays, such as interferometric modulator displays, cholesteric displays, electrophoretic displays, electrofluidic pixel displays, electrowetting displays, photonic ink displays, gyricon displays, and the like. In other implementations, or for other types of devices 1200, the display 1202 may be an active display such as a fluid crystal display, a plasma display, a light emitting diode display, an organic light emitting diode display, and so forth. Accordingly, implementations herein are not limited to any particular display technology.

In an implementation, the display comprises an electrowetting display that employs an applied voltage to change the surface tension of a fluid in relation to a surface. For example, such an electrowetting display may include the array of pixels 100 illustrated in FIG. 1, though claimed subject matter is not limited in this respect. By applying a voltage to a hydrophobic surface, the wetting properties of the surface can be modified so that the surface becomes more wettable to the second liquid. As one example of an electrowetting display, the modification of the surface tension acts as an optical switch by contracting a colored oil film when a voltage is applied to individual pixels of the display. When the voltage is absent, the colored oil forms a continuous film within a pixel, and the color may thus be visible to a user of the display. On the other hand, when the voltage is applied to the pixel, the colored oil is displaced and the pixel becomes transparent. When multiple pixels of the display are independently activated, the display can present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays herein may be suitable for applications such as displaying video content.

Of course, while several different examples have been given, it is to be appreciated that the reflective displays described herein may comprise any other type of electronic-paper technology or reflective-display technology, examples of which are provided above. In addition, while some of the examples described above are discussed as rendering black, white, and varying shades of gray, it is to be appreciated that the described techniques apply equally to reflective displays capable of rendering color pixels. As such, the terms "white," "gray," and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter. Furthermore, while some examples herein are described in the environment of a reflective display, in other examples, the display 1202 may represent a backlit display, examples of which are mentioned above.

In addition to including the display 1202, FIG. 12 illustrates that some examples of the device 1200 may include a touch sensor component 1206 and a touch controller 1208. In some instances, at least one touch sensor component 1206 resides with, or is stacked on, the display 1202 to form a touch-sensitive display (e.g., an electronic paper touch-sensitive display). Thus, the display 1202 may be capable of both accepting user touch input and rendering content in response to or corresponding to the touch input. As several examples, the touch sensor component 1206 may comprise a capacitive touch sensor, a force sensitive resistance (FSR), an interpolating force sensitive resistance (IFSR) sensor, or any other type of touch sensor. In some instances, the touch sensor component 1206 is capable of detecting touches as well as determining an amount of pressure or force of these touches.

FIG. 12 further illustrates that the electronic device 1200 may include one or more processors 1210 and one or more computer-readable media 1212, as well as a front light component 1214 (which may alternatively be a backlight component in the case of a backlit display) for lighting the display 1202, a cover layer component 1216, such as a cover glass or cover sheet, one or more communication interfaces 1218 and one or more power sources 1220. The communication interfaces 1218 may support both wired and wireless connection to various networks, such as cellular networks, radio, WiFi networks, short range networks (e.g., Bluetooth®), infrared (IR), and so forth.

Depending on the configuration of the electronic device 1200, the computer-readable media 1212 (and other computer-readable media described throughout) is an example of computer storage media and may include volatile and non-volatile memory. Thus, the computer-readable media 1212 may include, but is not limited to, RAM, ROM, EEPROM, flash memory, or other memory technology, or any other medium that can be used to store computer-readable instructions, programs, applications, media items, and/or data which can be accessed by the electronic device 1200.

The computer-readable media 1212 may be used to store any number of functional components that are executable on the processor 1210, as well as content items 1222 and applications 1224. Thus, the computer-readable media 1212 may include an operating system and a storage database to store one or more content items 1222, such as eBooks, audio books, songs, videos, still images, and the like. The computer-readable media 1212 of the electronic device 1200 may also store one or more content presentation applications to render content items on the device 1200. These content presentation applications may be implemented as various applications 1224 depending upon the content items 1222. For instance, the content presentation application may be an electronic book reader application for rending textual electronic books, an audio player for playing audio books or songs, a video player for playing video, and so forth.

In some instances, the electronic device 1200 may couple to a cover (not illustrated in FIG. 12) to protect the display (and other components in the display stack or display assembly) of the device 1200. In one example, the cover may include a back flap that covers a back portion of the device 1200 and a front flap that covers the display 1202 and the other components in the stack. The device 1200 and/or the cover may include a sensor (e.g., a Hall effect sensor) to detect when the cover is open (i.e., when the front flap is not atop the display and other components). The sensor may send a signal to the front light component 1214 when the cover is open and, in response, the front light component 1214 may illuminate the display 1202. When the cover is closed, meanwhile, the front light component 1214 may receive a signal indicating that the cover has closed and, in response, the front light component 1214 may turn off.

Furthermore, the amount of light emitted by the front light component 1214 may vary. For instance, upon a user opening the cover, the light from the front light may gradually increase to its full illumination. In some instances, the device 1200 includes an ambient light sensor (not illustrated in FIG. 12) and the amount of illumination of the front light component 1214 may be based at least in part on the amount of ambient light detected by the ambient light sensor. For example, the front light component 1214 may be dimmer if the ambient light sensor detects relatively little ambient light, such as in a dark room; may be brighter if the ambient light sensor detects ambient light within a particular range; and may be dimmer or turned off if the ambient light sensor detects a relatively large amount of ambient light, such as direct sunlight.

In addition, the settings of the display 1202 may vary depending on whether the front light component 1214 is on or off, or based on the amount of light provided by the front light component 1214. For instance, the electronic device 1200 may implement a larger default font or a greater contrast when the light is off compared to when the light is on. In some instances, the electronic device 1200 maintains, when the light is on, a contrast ratio for the display that is within a certain defined percentage of the contrast ratio when the light is off.

As described above, the touch sensor component 1206 may comprise a capacitive touch sensor that resides atop the display 1202. In some examples, the touch sensor component 1206 may be formed on or integrated with the cover layer component 1216. In other examples, the touch sensor component 1206 may be a separate component in the stack of the display assembly. The front light component 1214 may reside atop or below the touch sensor component 1206. In some instances, either the touch sensor component 1206 or the front light component 1214 is coupled to a top surface of a protective sheet 1226 of the display 1202. As one example, the front light component 1214 may include a lightguide sheet and a light source (not illustrated in FIG. 12). The lightguide sheet may comprise a substrate (e.g., a transparent thermoplastic such as PMMA or other acrylic), a layer of lacquer and multiple grating elements formed in the layer of lacquer that function to propagate light from the light source towards the display 1202, thus illuminating the display 1202.

The cover layer component 1216 may include a transparent substrate or sheet having an outer layer that functions to reduce at least one of glare or reflection of ambient light incident on the electronic device 1200. In some instances, the cover layer component 1216 may comprise a hard-coated polyester and/or polycarbonate film, including a base polyester or a polycarbonate, that results in a chemically bonded UV-cured hard surface coating that is scratch resistant. In some instances, the film may be manufactured with additives such that the resulting film includes a hardness rating that is greater than a predefined threshold (e.g., at least a hardness rating that is resistant to a 3h pencil). Without such scratch resistance, a device may be more easily scratched and a user may perceive the scratches from the light that is dispersed over the top of the reflective display. In some examples, the protective sheet 1226 may include a similar UV-cured hard coating on the outer surface. The cover layer component 1216 may couple to another component or to the protective sheet 1226 of the display 1202. The cover layer component 1216 may, in some instances, also include a UV filter, a UV-absorbing dye, or the like, for protecting components lower in the stack from UV light incident on the electronic device 1200. In still other examples, the cover layer component 1216 may include a sheet of high-strength glass having an antiglare and/or antireflective coating.

The display 1202 includes the protective sheet 1226 overlying an image-displaying component 1228. For example, the display 1202 may be preassembled to have the protective sheet 1226 as an outer surface on the upper or image-viewing side of the display 1202. Accordingly, the protective sheet 1226 may be integral with and may overlie the image-displaying component 1228. The protective sheet 1226 may be optically transparent to enable a user to view, through the protective sheet 1226, an image presented on the image-displaying component 1228 of the display 1202.

In some examples, the protective sheet 1226 may be a transparent polymer film in the range of 25 to 200 micrometers in thickness. As several examples, the protective sheet may be a transparent polyester, such as polyethylene terephthalate (PET) or polyethylene naphthalate (PEN), or other suitable transparent polymer film or sheet, such as a polycarbonate or an acrylic. In some examples, the outer surface of the protective sheet 1226 may include a coating, such as the hard coating described above. For instance, the hard coating may be applied to the outer surface of the protective sheet 1226 before or after assembly of the protective sheet 1226 with the image-displaying component 1228 of the display 1202. In some examples, the hard coating may include a photoinitiator or other reactive species in its composition, such as for curing the hard coating on the protective sheet 1226. Furthermore, in some examples, the protective sheet 1226 may be dyed with a UV-light-absorbing dye, or may be treated with other UV-absorbing treatment. For example, the protective sheet may be treated to have a specified UV cutoff such that UV light below a cutoff or threshold wavelength is at least partially absorbed by the protective sheet 1226, thereby protecting the image-displaying component 1228 from UV light.

According to some implementations herein, one or more of the components discussed above may be coupled to the display 1202 using fluid optically-clear adhesive (LOCA). For example, suppose that the light guide portion of the front light component 1214 is to be coupled to the display 1202. The light guide may be coupled to the display 1202 by placing the LOCA on the outer or upper surface of the protective sheet 1226. When the LOCA reaches the corner(s) and/or at least a portion of the perimeter of protective sheet, UV-curing may be performed on the LOCA at the corners and/or the portion of the perimeter. Thereafter, the remaining LOCA may be UV-cured and the front light component 1214 may be coupled to the LOCA. By first curing the corner(s) and/or perimeter, the techniques effectively create a barrier for the remaining LOCA and also prevent the formation of air gaps in the LOCA layer, thereby increasing the efficacy of the front light component 1214. In other implementations, the LOCA may be placed near a center of the protective sheet 1226, and pressed outwards towards a perimeter of the top surface of the protective sheet 1226 by placing the front light component 1214 on top of the LOCA. The LOCA may then be cured by directing UV light through the front light component 1214. As discussed above, and as discussed additionally below, various techniques, such as surface treatment of the protective sheet, may be used to prevent discoloration of the LOCA and/or the protective sheet 1226.

While FIG. 12 illustrates a few example components, the electronic device 1200 may have additional features or functionality. For example, the device 1200 may also include additional data storage devices (removable and/or non-removable) such as, for example, magnetic disks, optical disks, or tape. The additional data storage media, which may reside in a control board, such as control board 124 illustrated in FIG. 2, may include volatile and nonvolatile, removable and non-removable media implemented in any method or technology for storage of information, such as computer readable instructions, data structures, program modules, or other data. In addition, some or all of the functionality described as residing within the device 1200 may reside remotely from the device 1200 in some implementations. In these implementations, the device 1200 may utilize the communication interfaces 1218 to communicate with and utilize this functionality.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, apparatuses, or systems that would be known by one of ordinary skill have not been described in detail so as not to obscure claimed subject matter.

Reference throughout this specification to "one embodiment" or "an embodiment" can mean that a particular feature, structure, or characteristic described in connection with a particular embodiment can be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

What is claimed is:

1. A display device comprising:
   a glass substrate including:
      one or more pixel arrays formed on the glass substrate, wherein the pixel arrays include:
      first pixel walls that partition individual pixels of the pixel arrays and at least partially retain a first fluid within respective individual pixels,
      second pixel walls, and
      a second fluid to cover (i) the first pixel walls and the second pixel walls and (ii) the first fluid, wherein the first pixel walls have a first height and the second pixel walls have a second height, wherein the first height is greater than the second height, and the first pixel walls are aligned in a first direction to direct a flow of the second fluid toward a second direction.

2. The display device of claim 1, wherein the pixel arrays further include spacers that extend above the first pixel walls.

3. The display device of claim 1, wherein the pixel arrays further include spacers, and wherein (i) the spacers and (ii) the first pixel walls extend substantially a same distance from the glass substrate.

4. A display device comprising:
   an array of display elements formed on a transparent substrate, wherein the array of display elements includes
      a first fluid,
      a second fluid shared among the display elements, pixel walls that (i) partition the display elements from one another and (ii) at least partially retain the first fluid in each of the display elements, wherein first portions of the pixel walls (i) extend substantially further from the transparent substrate than second portions of the pixel walls and (ii) extend into the second fluid; and
      spacers that extend substantially further from the transparent substrate than the first portions of the pixel walls.

5. The display device of claim 4, wherein the first portions of the pixel walls comprise a first material and the second portions of the pixel walls comprise a second material identical to the first material.

6. The display device of claim 5, wherein the first material comprises a photoresist material.

7. The display device of claim 4, wherein the first portions of the pixel walls are aligned in a first direction on the substrate to direct a flow of the second fluid toward a second direction.

8. The display device of claim 4, further comprising:
   a transparent top plate at least partially covering (i) the array of display elements formed on the transparent substrate, (ii) an edge seal, and (iii) the spacers.

9. The display device claim 4, wherein the spacers extend a first distance from the transparent substrate, wherein the first portions of the pixel walls extend a second distance from the transparent substrate, and wherein the first distance is substantially the same as the second distance.

10. The display device of claim 4, wherein the first fluid is an electrically nonconductive oil and the second fluid is an electrically conductive solution or a polar solution.

11. The display device of claim 4, wherein the first portions of the pixel walls extend a first distance from the transparent substrate and the second portions of the pixel walls extend a second distance from the transparent substrate, wherein the second distance is about 1.5 to about 4.0 times greater than the first distance.

12. The display device of claim 4, wherein the display elements comprise electrowetting display elements.

13. The display device of claim 4, wherein the longest dimension of each of the first portions of the pixel walls is parallel to the transparent substrate and is aligned in the same direction as rows of the display elements.

14. A display device comprising:
   a display element formed on a substrate, wherein the display element includes
      a pixel wall at least partially surrounding the display element, wherein a first portion of the pixel wall extends substantially further from the substrate than a second portion of the pixel wall,
      a first fluid,
      a second fluid covering (i) the first fluid and (ii) the first portion and the second portion of the pixel wall, and
      a spacer that extends substantially further from the transparent substrate than the first portion of the pixel wall.

15. The display device of claim 14, wherein the first portion of the pixel wall comprises a first material and the second portion of the pixel wall comprises a second material identical to the first material.

16. The display device of claim 14, wherein the first portion of the pixel wall is aligned in a first direction on the substrate to direct a flow of the second fluid toward a second direction.

17. The display device of claim 14, wherein the first portion of the pixel wall extends a first distance from the transparent substrate and the second portion of the pixel wall extends a second distance from the transparent substrate, wherein the second distance is about 1.5 to about 4.0 times greater than the first distance.

18. The display device of claim 1, wherein the first pixel walls and the second pixel walls comprise a photoresist material.

19. The display device of claim 1, wherein the first pixel walls are oriented substantially perpendicularly to the second pixel walls.

* * * * *